United States Patent
Roes et al.

[11] Patent Number: 5,951,422
[45] Date of Patent: Sep. 14, 1999

[54] HUB AND PULLEY WITH RADIALLY INWARD ANNULAR COLLAR

[75] Inventors: John P. Roes, Strathroy, Canada; Yahya Hodjat, Oxford, Mich.; Michael H. Kutzscher, London, Canada

[73] Assignee: The Gates Corporation, Denver, Colo.

[21] Appl. No.: 08/668,898

[22] Filed: Jun. 24, 1996

[51] Int. Cl.⁶ .............. F16D 3/00; F16H 55/14; F16H 55/36
[52] U.S. Cl. .............. 474/94; 474/178; 474/903
[58] Field of Search .................. 474/903, 178, 474/94, 902, 174, 177; 29/892, 892.1, 892.11; 72/82, 84

[56] References Cited

U.S. PATENT DOCUMENTS

| | | | |
|---|---|---|---|
| 4,781,659 | 11/1988 | Gebhardt | 474/903 |
| 4,824,422 | 4/1989 | Jocic | 474/170 |
| 5,195,241 | 3/1993 | Bradfield | 474/903 |
| 5,308,289 | 5/1994 | Funahashi | 784/903 |
| 5,441,456 | 8/1995 | Watanabe et al. | 474/94 |
| 5,465,485 | 11/1995 | Miyake et al. | 474/178 |
| 5,591,093 | 1/1997 | Asai et al. | 474/94 |

FOREIGN PATENT DOCUMENTS 4444526 11/1996 Germany.

*Primary Examiner*—Tamara L. Graysay
*Assistant Examiner*—Matthew A. Kaness
*Attorney, Agent, or Firm*—C. H. Castleman, Esq.; H. W. Oberg, Esq.; S. G. Austin, Esq.

[57] ABSTRACT

A hub is spun rolled formed of a portion of metal radially displaced from a side of a disc of sheet metal. An annular collar formed of an annular part of the disc extends inward of the hub and creates a blind bore. The collar is integral with the hub and is formed of the same sheet metal. The so formed hub that is integral to a web formed of the disc, and the collar; the web may be connected to a rim, or the extremity of the disc may be shaped into a rim to form a pulley.

13 Claims, 5 Drawing Sheets

HUB AND PULLEY WITH RADIALLY INWARD ANNULAR COLLAR

BACKGROUND OF THE INVENTION

The invention relates to a hub or pulley of sheet metal made by spin-roll forming, but more particularly, the invention relates to a hub with a blind bore and a method of shaping the hub.

Machined hubs are sometimes attached to webs and rims formed of sheet metal to make pulleys. A sheet metal web (or disc) and rim are attached to a machined hub by welding or brazing. A machined hub may provide complicated shapes such as a closed bore but it introduces the attendant problems of weight, expense, and a troublesome process of precisely attaching and aligning a web and rim portion to complete the pulley.

Hubs or pulleys of sheet metal may be shaped by press forming using a series of dies or spin-forming using mandrels and rollers or a combination thereof. For example, a pulley with an integral hub that is press formed is disclosed in U.S. Pat. No. 5,441,456 with a stepped bore in FIG. 5, and a bore with spline receiving grooves in FIG. 8. Belt receiving grooves are spin formed in the rim of the pulley. Another pulley with an integral hub is shown in U.S. Pat. No. 4,824,422. A troublesome area with the press forming and spin forming processes is they may introduce folded metal shapes that introduce high stress areas at folds that are subject to failure by cracking or fracturing from fatigue.

German Patent No. 4444526 discloses a method of shaping a hub by spin forming where a shaping roller is pressed against a side of a spinning annular disc of sheet metal that is supported at an opposite side with a head stock mandrel. The shaping roller is moved progressively radially inwardly against the side of the rotating disc which displaces a portion of metal while thinning part of the disc and forming a sidewall having a thickness that is less the original sheet metal thickness. An annular wave is formed as metal is displaced and which progressively, axially extends. A shaping roller presses the so annularly displaced metal against a mandrel while simultaneously forming a hub integral to the disc. The present invention relates to spin-forming of this type where a hub is integral with a web or disc and where a hub is formed of displaced metal from a side of the disc formed of sheet metal. A problem with such hubs is that complicated bore shapes (i.e. a blind bore) cannot be readily produced in comparison to machined hubs.

SUMMARY OF THE INVENTION

A hub in accordance with the present invention is spun rolled formed of a portion of metal radially displaced from a side of an integral web or disc of sheet metal. An annular collar that extends inward of the hub and creates a blind bore. The collar is integral the hub and web or disc and is formed of the same sheet metal. The so formed hub that is integral to the web or disc and collar may be connected to a rim or the extremity of the disc may be shaped into a rim to form a pulley.

During the spinning process, a shaping roller is pressed against the side of an annular disc of sheet metal. The shaping roller is moved progressively, radially inwardly against the side of the rotating disc which displaces a portion of metal in the form of an axially extending annular wave. The so displaced metal is pressed against a shaping roller to form the integral hub having a bore. The annular disc has an inside diameter that is less than a maximum diameter of the hub bore. A stepped mandrel holds an annular inward portion of the disc during the spin-roll process of forming the hub and defines an annular collar that is integral with the disc and hub creating a blind bore of the hub.

An object of the invention is to provide a pulley with a hub that is integral to a web or disc and integral with a collar so as to define a blind bore of the hub. The blind bore and integral collar may be advantageously used to attach the hub at a precise axial position on a shaft. Optionally, a keyway or spline may be formed in the blind bore.

Another object of the invention is to provide a method of spin forming a hub with an integral web and collar from a sheet metal disc so as to provide a blind bore.

These and other objects or advantages of the invention will be apparent after reviewing the drawings and descriptions thereof wherein.

DESCRIPTION OF PREFERRED EMBODIMENT

Figure 1:
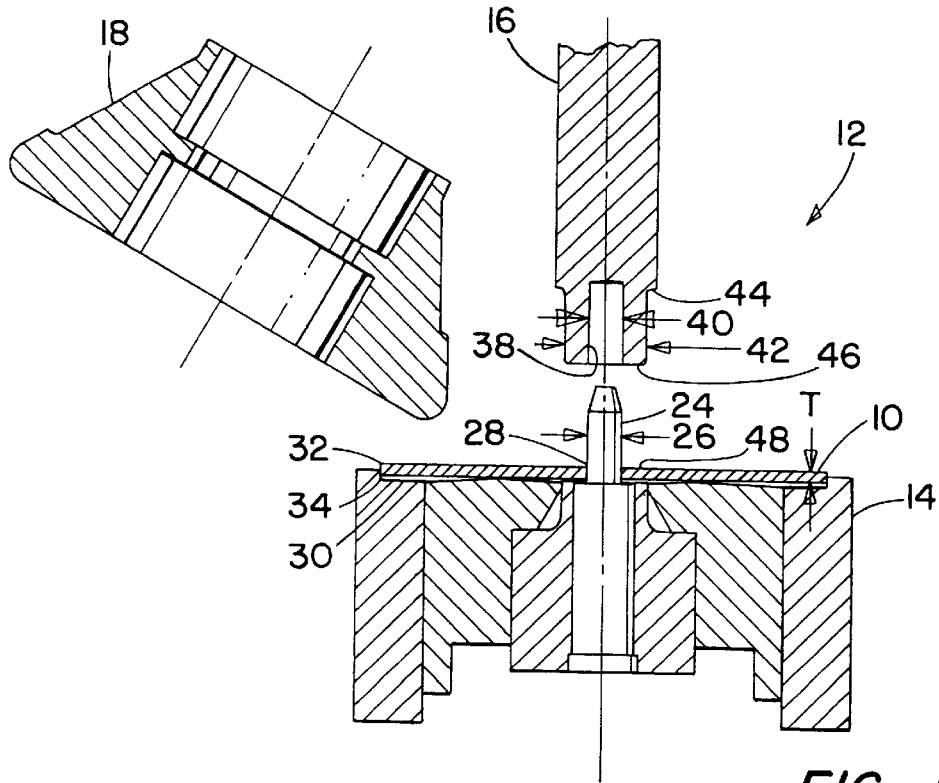
FIG. 1 is a schematic in cross-section illustrating key elements of a spin-roll forming machine and an annular disc positioned in the machine for spin-roll forming.

Referring to FIGS. 1–7, an annular disc 10 of sheet metal is positioned for working with spin-roll forming machinery 12 that includes a head stock mandrel 14, a stepped mandrel 16, a first shaping roller 18, a holding roller 20 and a second shaping or hub finishing roller 22.

In FIG. 1, the annular disc 10 is positioned over a pilot 24 of the head stock mandrel 14 where the outside 26 diameter of the pilot is sized for an inside diameter 28 of the disc. The head stock 14 has a cylindrical recess 30 sized to receive the external diameter 32 of the disc and where the recess has a depth 34 that is less than the thickness T of the disc.

The stepped mandrel 16 has a pilot receiving bore 38 with an internal diameter 40 sized to receive the pilot, an external diameter 42 sized for a desired internal diameter of a hub to be formed, a radial step 44 sized for a desired thickness of the hub to be formed and, an end 46 sized to receive and hold an annular inward portion 48 of the disc. The step mandrel 16, first shaping roller 18, holding roller 20 and second shaping roller 22 are positioned away from the head stock mandrel 14 in a start position to facilitate loading and positioning the annular disc 10 over the pilot and against the head stock mandrel.

Figure 2:
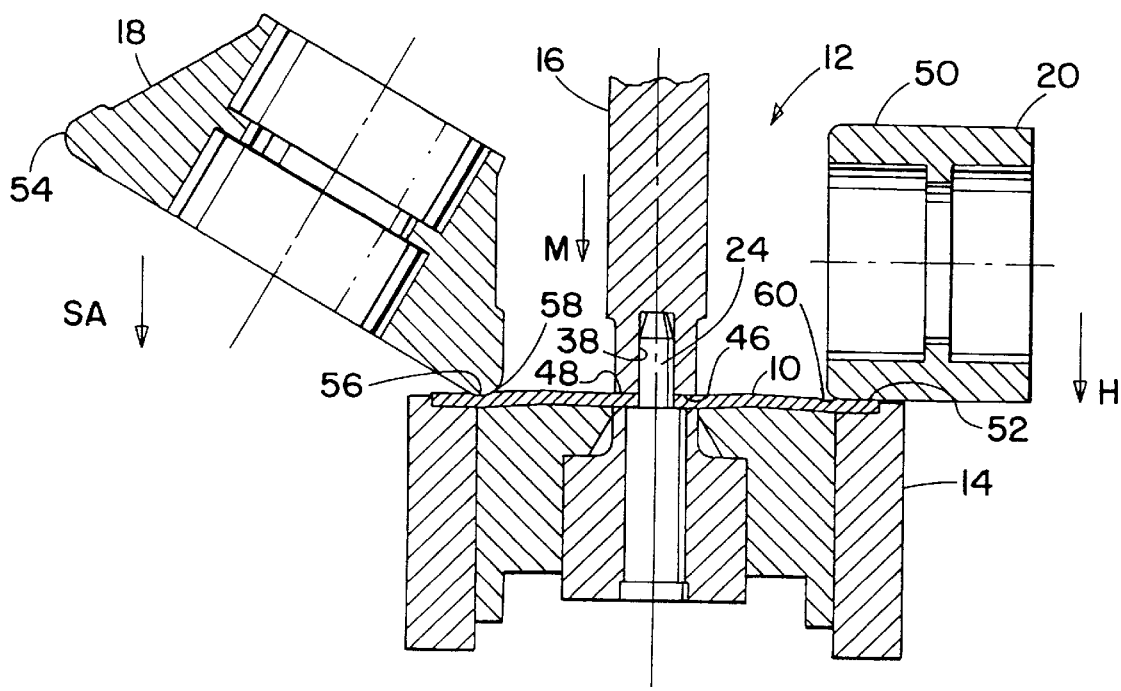
FIG. 2 is a view similar to FIG. 1 but showing the machine and disc positioned near the start of spin-roll forming.
Figure 3:
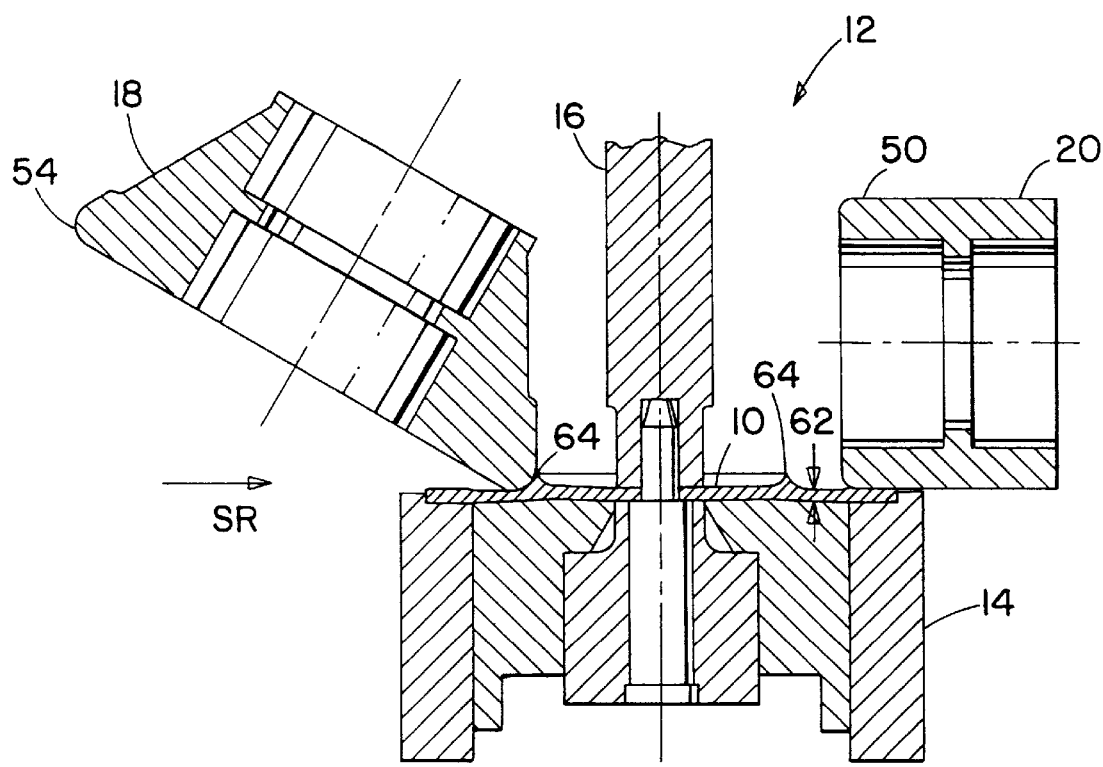
FIG. 3 is a view similar to FIG. 2 but showing a progressive operational step.

FIG. 2 shows the spin-roll forming machine 12 in an initial run position where the annular disc is starting to be shaped into a form that, when finished, includes the features of the invention. The stepped mandrel is moved in an axial direction M where the pilot 24 is in an engaged position with the pilot receiving bore 38. The end 46 is pressed against the annular inward portion 48 of the disc to hold it in position during the forming process.

Holding roller 20 is transferred to its operating position and moved in a direction H so that a cylindrical surface 50 of the roller presses against an exposed annular portion 52 of the disc to thereby hold it in a sandwiched position against the head stock mandrel.

The shaping roller is transferred to an initial forming position by moving it in a direction SA so that a rounded edge 54 of the shaping roller is pressed against the disc. The mandrel and head stock are rotated which spins the disc. Holding roller 20 and shaping roller 18 are also free to rotate as the disc spins. The shaping roller with its rounded surface 54, initiates displacing a portion of metal 58 from a side of the disc which is supported at an opposite side by the head stock mandrel. The initial displacement forms an annular groove 60 in the side of the disc being worked. The shaping roller is moved progressively radially inwardly against the side of the disc which displaces metal from the side of the disc and thins the disc while forming a thinner sidewall 62 in a portion of the disc. The shaping roller forms a progressively axially extending annular wave 64 of the so displaced metal.

Figure 4:
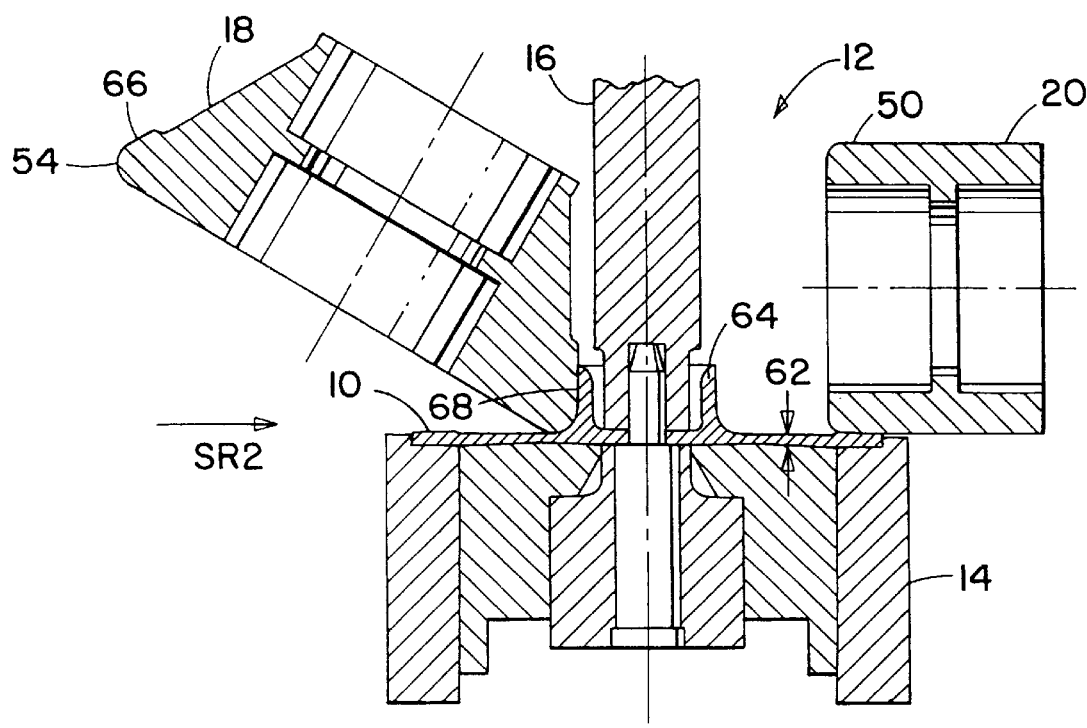
FIG. 4 is a view similar to FIG. 3 but showing a progressive operational step.

The shaping roller continues to move progressively inwardly in the direction SR2 as shown in FIG. 4. The axially extending annular wave 64 lengthens and is contacted by a tapered surface 66 of the shaping roller. The tapered surface is oriented so as to be substantially parallel 68 when it is in contact with the axially extending annular wave. Contact with the tapered surface causes the wave to take an initial hub shape 70.

Figure 5:
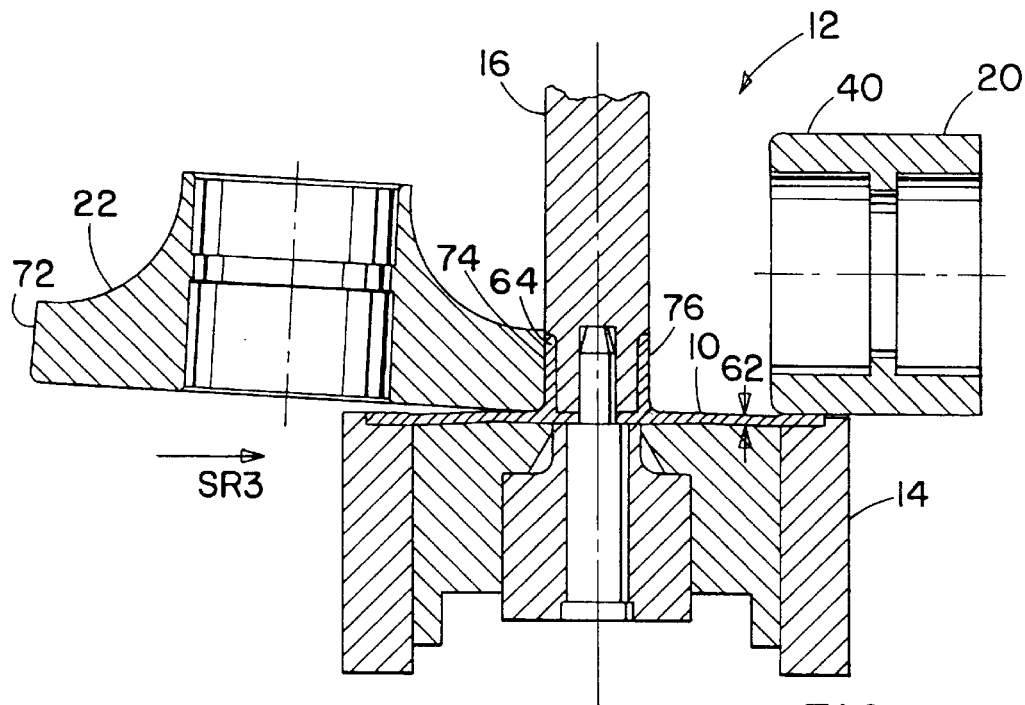
FIG. 5 is a view similar to FIG. 4 but showing a final spin forming stop.

The radially inward movement of the first shaping roller is stopped at a predetermined position as the progressively extending annular wave approaches contact with the stepped mandrel. As shown in FIG. 5, the secondary shaping or hub forming roller 22 is activated and positioned with a tapered surface 72 against the progressively extending annular wave 64. The tapered surface 72 is positioned to be substantially parallel 74 with the stepped mandrel 16 when it is in contact with the annular wave 64. The shaping roller is moved progressively radially inwardly in the direction SR3 which presses the annular wave 64 against the stepped mandrel 16 forming hub 76 which is integral with the disc and the disc having a thinner side wall 62 or web.

Figure 6:
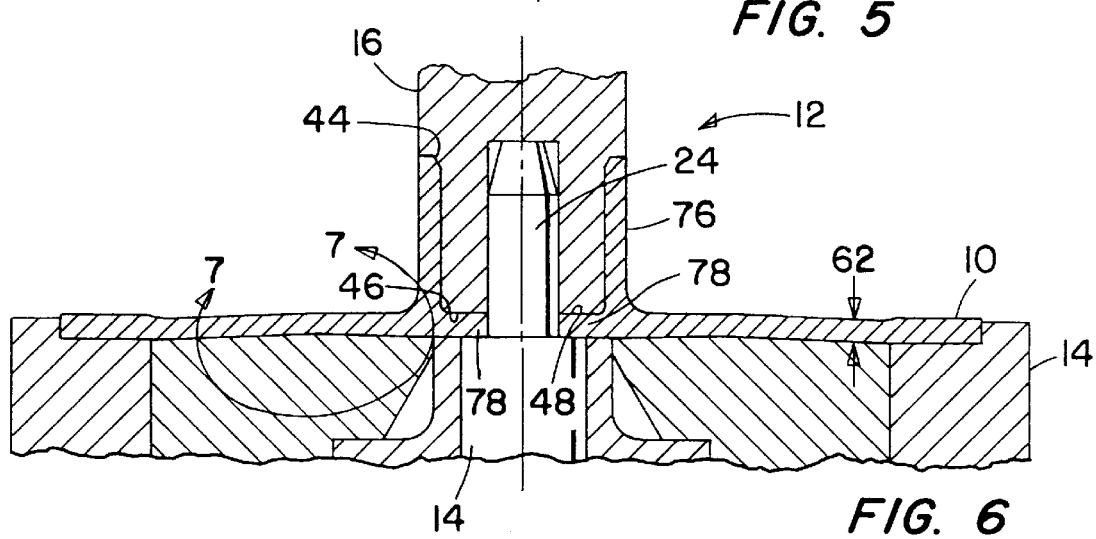
FIG. 6 is an enlarged view of a portion of FIG. 5 showing a hub of the invention as formed by spin forming and while still positioned in the machine.

As shown in FIG. 6, the annular inward portion 48 of the disc is held between the end 46 of the stepped mandrel and the head stock 14. The annular inward portion 48 defines an annular collar that is integral with the disc and hub creating a blind bore of the hub which is later explained in conjunction with FIGS. 8a to 8e.

Figure 7:
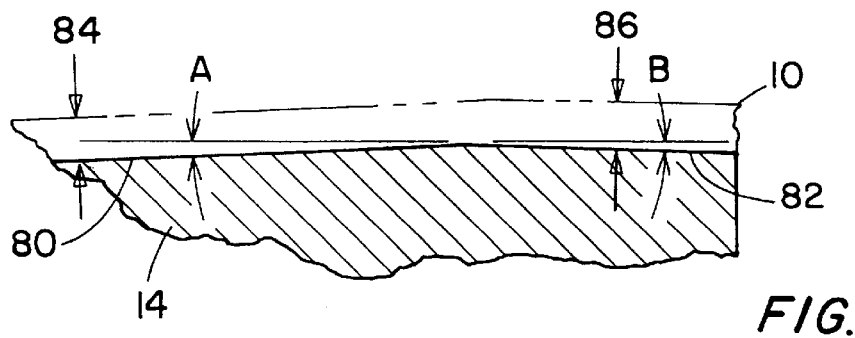
FIG. 7 is an enlarged view taken along the line 7—7 of FIG. 6 and showing a detail of the spin-roll tooling.

Referring to FIG. 7, it is preferred that the head stock mandrel include a tapered surface 80 at an angle A of about 2–3°, or more preferably 2° 2"; and an obverse tapered surface 82 at an angle B of about 1–2°, and more preferably, about 1° 31". When such a tapered head stock mandrel is used, the sidewall 62 (shown in phantom for clarity) the sidewall progressively tapers at the angle A and in a direction of the wave 64 during the forming process as the shaping roller moves progressively radially inwardly, and progressively obversely tapers at an angle B during forming the wave as the shaping roller moves progressively radially inwardly. The taper and obverse taper of the disc sidewall prevents the displaced metal from folding as the hub is formed during the spin-roll forming process.

FIGS. 8a through 8e illustrate the progressive formation of a hub of the invention when a head stock mandrel having a taper and obverse taper is used. As previously explained, the process of forming an integral hub of the invention starts with an annular disc 10 of sheet metal with an annular inward portion that is held in sandwiched fashion between the stepped mandrel and head stock mandrel (not shown) in FIG. 8a.

Figure 8A:
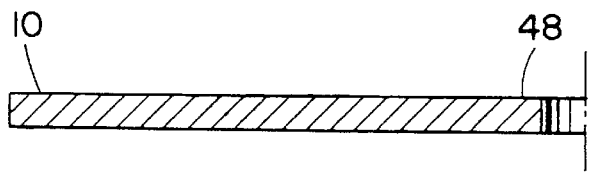
FIGS. 8a–8e are cross sections along a radial line from the center line of a annular disc showing progressive displacement of the portion of metal from a portion of the annular disc and the formation of a hub of the invention.
Figure 8B:
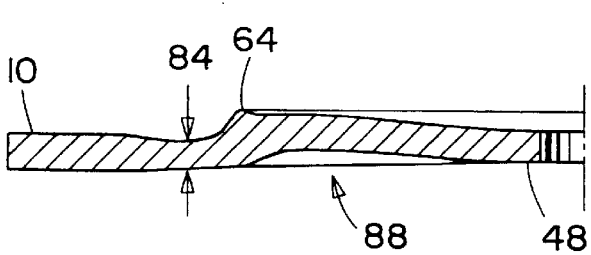

Referring to FIG. 8b, a progressively extending annular wave 64 forms as the shaping roller moves progressively radially inwardly of the disc as metal is displaced from a side of a disc. A thinner sidewall 84 is formed which progressively tapers in a direction of the wave 64. As the wave is formed, a progressively annular groove 88 also forms generally opposite the annular wave on the opposite side of the disc.

Figure 8C:
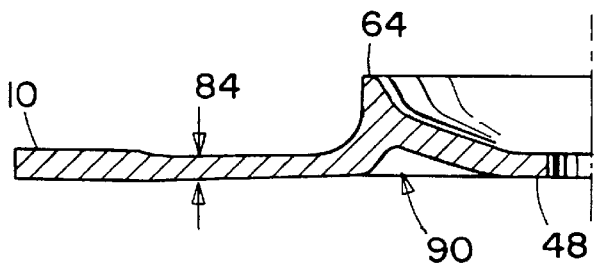

As the shaping roller moves progressively radially inwardly, the annular wave 64 extends axially farther as shown in FIG. 8c and the annular groove 90 becomes deeper in a narrowing annular band.

Figure 8D:
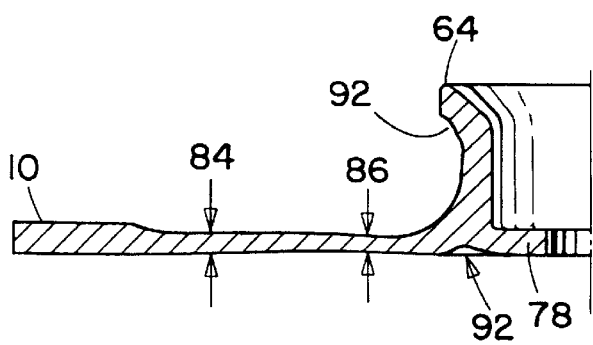

Referring to FIG. 8d, the sidewall 86 obversely tapers as the shaping roller progressively moves radially inwardly and the sidewall follows the obverse taper of the head stock mandrel. The annular wave 64 extends axially to a greater extent and may curl 92 around the rounded surface 54 of the shaping roller. The annular groove 92 starts to collapse as it becomes shallower and narrower.

Figure 8F:
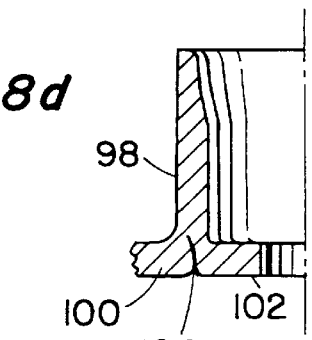
FIG. 8f is a partial view similar to FIG. 9 illustrating a fold in the formation of a hub.
Figure 8E:
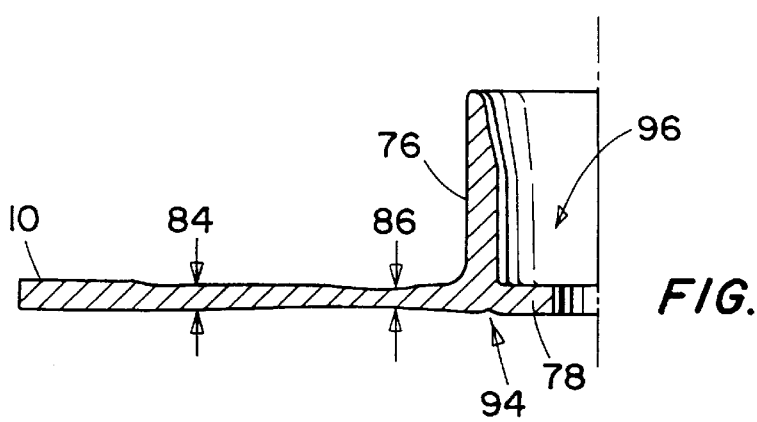
Figure 9:
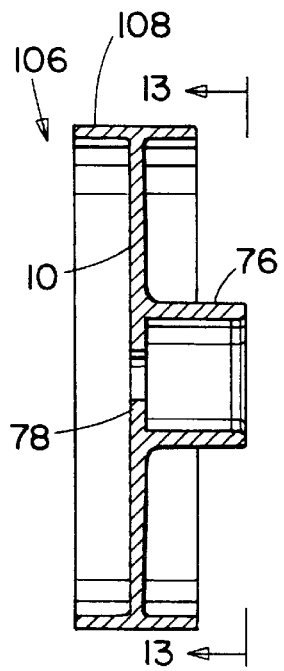
FIG. 9 is a cross sectional view of a flat pulley with a hub of the invention.

In FIG. 8e, the forming process is completed when the second or shaping roller 22 forms the annular wave into a hub 76. The annular groove 96 collapses leaving an integral disc 10, hub 76, and collar that defines a blind bore 94 of the hub where the inside diameter 28 of the disc is less than the diameter 42 that establishes the hub bore.

If care is not taken during the spin forming process, it is possible that the annular groove will collapse in such a manner that a portion of the sidewall folds over itself as the annular groove 88, 90, 92, 94 collapses when the hub 76 is formed. Referring to FIG. 8f, a hub 98 integral with a disc sidewall 100 and an annular collar 102, may include a circumferential fold if care is not taken in forming the sidewall during the forming process. It is believed that when side-wall 84 is formed with a taper followed by an obverse taper, it helps to control flow of the displaced metal so that there is no appreciable folding of the metal near the hub that would weaken the hub when the groove 94 collapses. The hub with a fold 104 usually results when a flat head stock mandrel is used.

The hub 76 of the invention with its integral disc 10 or web and integral annular collar 78 may be used in conjunction with pulleys as for example, those shown in FIGS. 9–14. Referring the FIG. 9, a cylindrical pulley 106 is illustrated. The outer circumferential edge of disc 10 (or web) is split in known fashion to form an integral, cylindrical rim 108.

Figure 10:
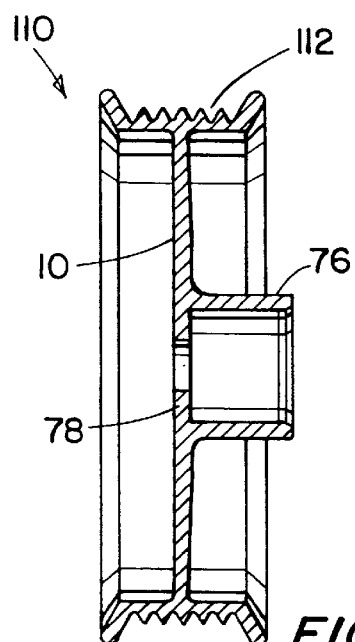
FIG. 10 is a cross sectional view of a v-ribbed pulley with a hub of the invention.

A v-ribbed pulley 110 is shown in FIG. 10 where the outer circumferential edge of the disc 10 is split in known fashion to form a rim 110 having a plurality of v-grooves 112 for engaging a v-ribbed belt.

Figure 11:
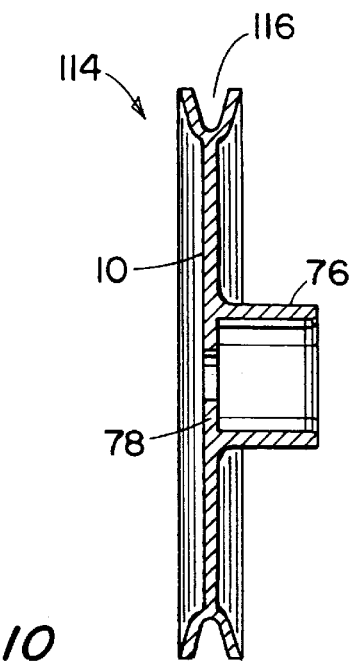
FIG. 11 is a cross sectional view of a v-belt pulley with a hub of the invention.

In FIG. 11, a v-belt pulley 114 is shown where the outer circumferential edge of the disc 10 is split in known fashion to form a rim 114 having at least one v-groove 116.

Figure 12:
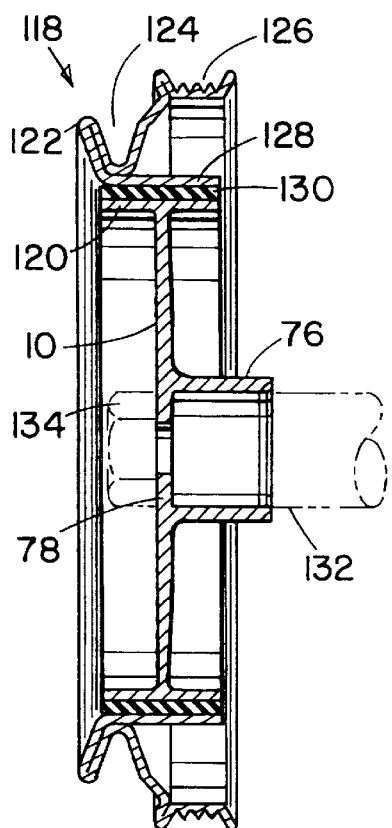
FIG. 12 is a cross sectional view of a pulley with a belt engaging rim portion that is attached to a hub of the invention.

In FIG. 12, a combination v-belt/v-ribbed pulley 118 is shown where the outer circumferential edge of the disc 10 is formed in known fashion into a substantially cylindrical surface 120. A rim of spun sheet metal 122 is fabricated in known fashion such as by using a sheet metal cup and spin-roll forming it into a rim that includes roller spin forming processes and is fabricated to include a v-belt groove 124 and v-ribbed grooves 126. The rim 118 is formed with a cylindrical member 128 that has a diameter that is larger than the rim 20 of the disc 10. The rim 120 of the disc 10 is attached to the cylindrical member 128 by means of a layer of rubber 130. The layer of rubber 130 may be advantageously used to provide resilience between the hub 16 and rim 122 to effect a damper.

As shown in FIG. 12, the hub 76 is positioned over a shaft 132 which is shown in phantom. The pulley 118 is attached to the shaft 132 such as by means of a cap screw 134, shown in phantom.

Figure 13:
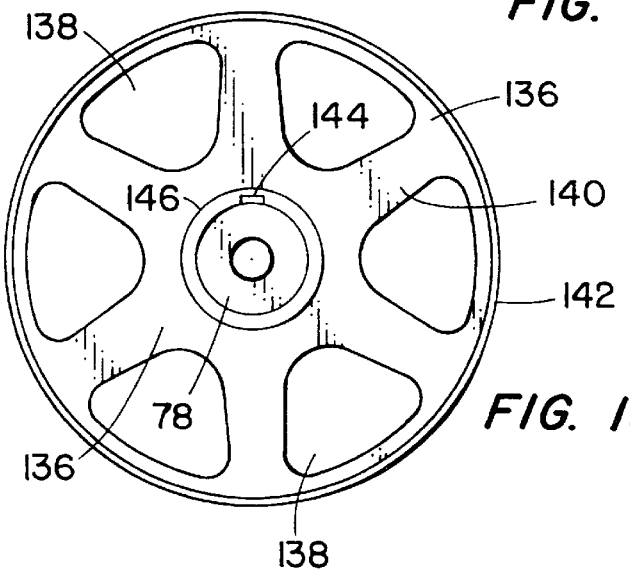
FIG. 13 is a view taken along the line 13—13 of FIG. 9 showing an optional embodiment of a web integral with a hub of the invention.

Referring the FIG. 13, the disc 136 may optionally include a plurality of perforations 138 so as to define arms 140 that connect to the pulley rim 142. The perforation are optionally used to lighten the pulley. A keyway 144 may optionally be formed in the bore of the integral hub 146.

Figure 14:
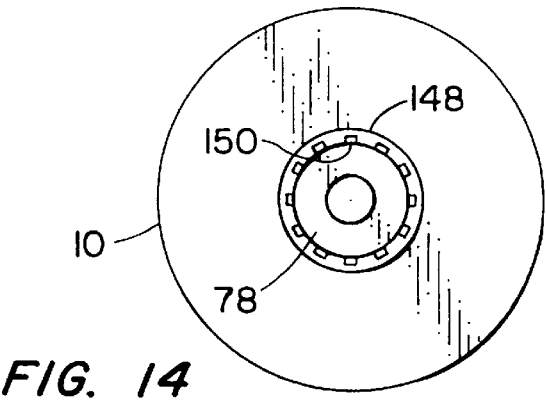
FIG. 14 is a view similar to FIG. 13 showing an optional embodiment for a hub of the invention.

Referring the FIG. 14, the disc 10 may optionally include a hub 148 that has spline receiving grooves 150 formed in its bore.

The foregoing detailed description is made for the purpose of illustrating only and is not intended to limit the scope of the claims.

What is claimed is:

1. A pulley with a hub that is spun-roll formed of a portion of metal radially displaced from a side of an integral, annular disc of sheet metal leaving a web and wherein the improvement comprises:

the disc having an annular inward portion that forms an annular collar extending radially inward of an internal diameter of the hub and wherein the collar is integral with the web prior to the spun-roll formation of the hub and defines a blind bore of the hub.

2. The pulley as claimed in claim 1 wherein the disc interconnects to a rim with a belt receiving portion selected from the group consisting of 1) a substantially cylindrical surface and 2) at least one v-groove.

3. The pulley as claimed in claim 2 wherein the rim is formed of sheet metal by spin forming.

4. The pulley as claimed in claim 3 wherein the web is integrally connected to the rim.

5. The pulley as claimed in claim 3 wherein the web is connected to the rim with an intermediate layer of rubber.

6. The pulley as claimed in claim 3 wherein the hub has spline receiving grooves formed at an internal diameter of the hub.

7. The pulley as claimed in claim 3 wherein the hub has a keyway formed at an internal diameter of the hub.

8. The pulley as claimed in claim 1 wherein the disc has a sidewall with a radially outer portion that tapers in a direction toward the hub and an interconnected radially inward portion that obversely tapers.

9. The hub as claimed in claim 8 wherein the hub has a keyway formed at an internal diameter of the hub.

10. The pulley as claimed in claim 1 wherein the collar is a substantially undeformed annular inward portion of the disc.

11. A hub that is spun-roll formed of a portion of metal radially displaced from a side of an integral, annular disc of sheet metal and wherein the improvement comprises:

the disc having an annular inward portion that forms an annular collar extending radially inward of an internal diameter of the hub and wherein the collar is integral with the web prior to the spun-roll formation of the hub and defines a blind bore of the hub.

12. The hub as claimed in claim 11 wherein the hub has spline receiving grooves formed at an internal diameter of the hub.

13. A pulley with a hub and a web formed of an integral disc of sheet metal and wherein the improvement comprises:

the disc having an annular inward portion that forms an annular collar extending radially inward of an internal diameter of the hub and wherein the collar is integral with the web prior to the spun-roll formation of the hub and defines a blind bore of the hub.

* * * * *